(12) United States Patent
Schroeder (10) Patent No.: US 11,015,843 B2
(45) Date of Patent: May 25, 2021

(54) CALORIC HEAT PUMP HYDRAULIC SYSTEM

(71) Applicant: Haier US Appliance Solutions, Inc., Wilmington, DE (US)

(72) Inventor: Michael Goodman Schroeder, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 153 days.

(21) Appl. No.: 16/424,551

(22) Filed: May 29, 2019

(65) Prior Publication Data
US 2020/0378655 A1   Dec. 3, 2020

(51) Int. Cl.
F25D 11/02 (2006.01)
F25B 21/00 (2006.01)

(52) U.S. Cl.
CPC .............. F25B 21/00 (2013.01); F25D 11/02 (2013.01); *F25B 2300/00* (2013.01); *F25B 2321/002* (2013.01); *F25B 2321/0022* (2013.01); *F25B 2600/2507* (2013.01)

(58) Field of Classification Search
CPC ................ F25B 21/00; F25B 2321/002; F25B 2321/0022
See application file for complete search history.

(56) References Cited

U.S. PATENT DOCUMENTS

| 668,560 A | 2/1901 | Fulner et al. |
|---|---|---|
| 1,985,455 A | 12/1934 | Mosby |
| 2,671,929 A | 3/1954 | Gayler |
| 2,765,633 A | 10/1956 | Muffly |
| 3,618,265 A | 11/1971 | Croop |
| 3,816,029 A | 6/1974 | Bowen et al. |
| 3,844,341 A | 10/1974 | Bimshas, Jr. et al. |
| 3,956,076 A | 5/1976 | Powell, Jr. et al. |
| 4,037,427 A | 7/1977 | Kramer |

(Continued)

FOREIGN PATENT DOCUMENTS

| CA | 2893874 A1 | 6/2014 |
|---|---|---|
| CA | 2919117 A1 | 1/2015 |

(Continued)

OTHER PUBLICATIONS

International Search Report issued in connection with PCT Application No. PCT/US2014/042485 dated Oct. 23, 2014.

(Continued)

*Primary Examiner* — Christopher R Zerphey
(74) *Attorney, Agent, or Firm* — Dority & Manning, P.A.

(57) ABSTRACT

A refrigerator appliance includes a fresh food working fluid circuit that couples a hot side heat exchanger, a fresh food cold side heat exchanger and a fresh food regenerator. A first pair of diverter valves and a hot side reservoir are coupled to the fresh food working fluid circuit. The hot side reservoir is positioned below one or both of the first pair of diverter valves. A freezer working fluid circuit couples a freezer cold side heat exchanger and a freezer regenerator. A second pair of diverter valves and a fresh food cold side reservoir are coupled to the freezer working fluid circuit. The fresh food cold side reservoir is positioned below one or both of the second pair of diverter valves. A liquid-liquid heat exchanger is also coupled to the fresh food working fluid circuit.

19 Claims, 4 Drawing Sheets

(56) References Cited

U.S. PATENT DOCUMENTS

| | | |
|---|---|---|
| 4,102,655 A | 7/1978 | Jeffery et al. |
| 4,107,935 A | 8/1978 | Steyert, Jr. |
| 4,197,709 A | 4/1980 | Hochstein |
| 4,200,680 A | 4/1980 | Sasazawa et al. |
| 4,259,843 A | 4/1981 | Kausch |
| 4,332,135 A | 6/1982 | Barclay et al. |
| 4,408,463 A | 10/1983 | Barclay |
| 4,507,927 A | 4/1985 | Barclay |
| 4,507,928 A | 4/1985 | Johnson |
| 4,549,155 A | 10/1985 | Halbach |
| 4,554,790 A | 11/1985 | Nakagome et al. |
| 4,557,228 A | 12/1985 | Samodovitz |
| 4,599,866 A | 7/1986 | Nakagome et al. |
| 4,625,519 A | 12/1986 | Hakuraku et al. |
| 4,642,994 A | 2/1987 | Barclay et al. |
| 4,735,062 A | 4/1988 | Woolley et al. |
| 4,741,175 A | 5/1988 | Schulze |
| 4,785,636 A | 11/1988 | Hakuraku et al. |
| 4,796,430 A | 1/1989 | Malaker et al. |
| 5,062,471 A | 11/1991 | Jaeger |
| 5,091,361 A | 2/1992 | Hed |
| 5,156,003 A | 10/1992 | Yoshiro et al. |
| 5,190,447 A | 3/1993 | Schneider |
| 5,249,424 A | 10/1993 | DeGregoria et al. |
| 5,336,421 A | 8/1994 | Kurita et al. |
| 5,351,791 A | 10/1994 | Rosenzweig |
| 5,465,781 A | 11/1995 | DeGregoria |
| 5,599,177 A | 2/1997 | Hetherington |
| 5,661,895 A | 9/1997 | Irgens |
| 5,718,570 A | 2/1998 | Beckett et al. |
| 5,934,078 A | 8/1999 | Lawton, Jr. et al. |
| 6,332,323 B1 | 12/2001 | Reid et al. |
| 6,423,255 B1 | 7/2002 | Hoechsmann et al. |
| 6,446,441 B1 | 9/2002 | Dean |
| 6,467,274 B2 | 10/2002 | Barclay et al. |
| 6,517,744 B1 | 2/2003 | Hara et al. |
| 6,526,759 B2 | 3/2003 | Zimm et al. |
| 6,588,215 B1 | 7/2003 | Ghoshal |
| 6,612,816 B1 | 9/2003 | Vanden Brande et al. |
| 6,668,560 B2 | 12/2003 | Zimm et al. |
| 6,826,915 B2 | 12/2004 | Wada et al. |
| 6,840,302 B1 | 1/2005 | Tanaka et al. |
| 6,915,647 B2 | 7/2005 | Tsuchikawa et al. |
| 6,935,121 B2 | 8/2005 | Fang et al. |
| 6,946,941 B2 | 9/2005 | Chell |
| 6,971,245 B2 | 12/2005 | Kuroyanagi |
| 7,148,777 B2 | 12/2006 | Chell et al. |
| 7,297,270 B2 | 11/2007 | Bernard et al. |
| 7,313,926 B2 | 1/2008 | Gurin |
| 7,481,064 B2 | 1/2009 | Kitanovski et al. |
| 7,552,592 B2 | 6/2009 | Iwasaki et al. |
| 7,644,588 B2 | 1/2010 | Shin et al. |
| 7,863,789 B2 | 1/2011 | Zepp et al. |
| 7,897,898 B2 | 3/2011 | Muller et al. |
| 7,938,632 B2 | 5/2011 | Smith |
| 8,061,147 B2 | 11/2011 | Dinesen et al. |
| 8,069,662 B1 | 12/2011 | Albert |
| 8,099,964 B2 | 1/2012 | Saito et al. |
| 8,174,245 B2 | 5/2012 | Carver |
| 8,191,375 B2 | 6/2012 | Sari et al. |
| 8,209,988 B2 | 7/2012 | Zhang et al. |
| 8,216,396 B2 | 7/2012 | Dooley et al. |
| 8,310,325 B2 | 11/2012 | Zhang et al. |
| 8,375,727 B2 | 2/2013 | Sohn |
| 8,378,769 B2 | 2/2013 | Heitzler et al. |
| 8,448,453 B2 | 5/2013 | Bahl et al. |
| 8,551,210 B2 | 10/2013 | Reppel et al. |
| 8,596,084 B2 | 12/2013 | Herrera et al. |
| 8,616,009 B2 | 12/2013 | Dinesen et al. |
| 8,656,725 B2 | 2/2014 | Muller et al. |
| 8,695,354 B2 | 4/2014 | Heitzler et al. |
| 8,729,718 B2 | 5/2014 | Kuo et al. |
| 8,763,407 B2 | 7/2014 | Carroll et al. |
| 8,769,966 B2 | 7/2014 | Heitzler et al. |
| 8,869,541 B2 | 10/2014 | Heitzler et al. |
| 8,875,522 B2 * | 11/2014 | Watanabe .............. F25B 21/00 62/3.7 |
| 8,904,806 B2 | 12/2014 | Cramet et al. |
| 8,935,927 B2 | 1/2015 | Kobayashi et al. |
| 8,978,391 B2 | 3/2015 | Muller et al. |
| 9,173,415 B2 * | 11/2015 | Meillan ..................... A01J 9/04 |
| 9,175,885 B2 | 11/2015 | Katter |
| 9,245,673 B2 | 1/2016 | Carroll et al. |
| 9,377,221 B2 | 6/2016 | Benedict |
| 9,400,126 B2 | 7/2016 | Takahashi et al. |
| 9,523,519 B2 | 12/2016 | Muller |
| 9,534,817 B2 | 1/2017 | Benedict et al. |
| 9,548,151 B2 | 1/2017 | Muller |
| 9,599,374 B2 | 3/2017 | Takahashi et al. |
| 9,599,375 B2 * | 3/2017 | Choi ...................... F25B 21/00 |
| 9,631,843 B2 | 4/2017 | Benedict |
| 9,702,594 B2 | 7/2017 | Vetrovec |
| 9,739,510 B2 | 8/2017 | Hassen |
| 9,746,214 B2 | 8/2017 | Zimm et al. |
| 9,797,630 B2 | 10/2017 | Benedict et al. |
| 9,810,454 B2 | 11/2017 | Tasaki et al. |
| 9,857,105 B1 | 1/2018 | Schroeder et al. |
| 9,857,106 B1 | 1/2018 | Schroeder et al. |
| 9,927,155 B2 | 3/2018 | Boeder et al. |
| 9,964,344 B2 * | 5/2018 | Kim ....................... F25B 21/00 |
| 9,978,487 B2 | 5/2018 | Katter et al. |
| 10,006,674 B2 * | 6/2018 | Benedict ................ F25D 11/02 |
| 10,006,675 B2 * | 6/2018 | Benedict ................ F25D 17/02 |
| 10,018,385 B2 | 7/2018 | Radermacher et al. |
| 10,030,895 B2 * | 7/2018 | Kim ....................... F25B 21/00 |
| 10,047,979 B2 * | 8/2018 | Benedict ................. F25B 21/00 |
| 10,047,980 B2 * | 8/2018 | Schroeder ............... F25B 41/04 |
| 10,443,585 B2 * | 10/2019 | Schroeder ............ F04B 1/0426 |
| 10,684,044 B2 | 6/2020 | Schroeder |
| 2002/0040583 A1 | 4/2002 | Barclay et al. |
| 2002/0066368 A1 | 6/2002 | Zornes |
| 2002/0087120 A1 | 7/2002 | Rogers et al. |
| 2003/0010054 A1 | 1/2003 | Esch et al. |
| 2003/0051774 A1 | 3/2003 | Saito |
| 2004/0093877 A1 | 5/2004 | Wada |
| 2004/0182086 A1 | 9/2004 | Chiang et al. |
| 2004/0187510 A1 | 9/2004 | Jung |
| 2004/0187803 A1 | 9/2004 | Regev |
| 2004/0250550 A1 | 12/2004 | Bruck |
| 2005/0017394 A1 | 1/2005 | Hochsmann et al. |
| 2005/0046533 A1 | 3/2005 | Chell |
| 2005/0109490 A1 | 5/2005 | Harmon et al. |
| 2005/0217278 A1 | 10/2005 | Mongia et al. |
| 2005/0263357 A1 | 12/2005 | Kuwahara |
| 2005/0274676 A1 | 12/2005 | Kumar et al. |
| 2006/0130518 A1 | 6/2006 | Kang et al. |
| 2006/0231163 A1 | 10/2006 | Hirosawa et al. |
| 2006/0279391 A1 | 12/2006 | Xia |
| 2007/0130960 A1 | 6/2007 | Muller et al. |
| 2007/0220901 A1 | 9/2007 | Kobayashi |
| 2008/0223853 A1 | 9/2008 | Muller et al. |
| 2008/0236171 A1 | 10/2008 | Saito et al. |
| 2008/0236175 A1 | 10/2008 | Chaparro Monferrer et al. |
| 2008/0303375 A1 | 12/2008 | Carver |
| 2009/0032223 A1 | 2/2009 | Zimmerman et al. |
| 2009/0091411 A1 | 4/2009 | Zhang et al. |
| 2009/0158749 A1 | 6/2009 | Sandeman |
| 2009/0217674 A1 | 9/2009 | Kaji et al. |
| 2009/0236930 A1 | 9/2009 | Nashiki |
| 2009/0266083 A1 | 10/2009 | Shin et al. |
| 2009/0308080 A1 | 12/2009 | Han et al. |
| 2009/0314860 A1 | 12/2009 | Wang et al. |
| 2009/0320499 A1 | 12/2009 | Muller et al. |
| 2010/0000228 A1 | 1/2010 | Wiest et al. |
| 2010/0058775 A1 | 3/2010 | Kaji et al. |
| 2010/0071383 A1 | 3/2010 | Zhang et al. |
| 2010/0116471 A1 | 5/2010 | Reppel et al. |
| 2010/0122488 A1 | 5/2010 | Fukai |
| 2010/0150747 A1 | 6/2010 | Mehta et al. |
| 2010/0162747 A1 | 7/2010 | Hamel et al. |
| 2010/0209084 A1 | 8/2010 | Nelson et al. |
| 2010/0236258 A1 | 9/2010 | Heitzler et al. |
| 2010/0276627 A1 | 11/2010 | Mazet |
| 2010/0303917 A1 | 12/2010 | Watson et al. |

(56) References Cited

U.S. PATENT DOCUMENTS

| | | |
|---|---|---|
| 2011/0000206 A1 | 1/2011 | Aprad |
| 2011/0042608 A1 | 2/2011 | Reesink |
| 2011/0048031 A1 | 3/2011 | Barve |
| 2011/0048690 A1 | 3/2011 | Reppel et al. |
| 2011/0058795 A1 | 3/2011 | Kleman et al. |
| 2011/0061398 A1 | 3/2011 | Shih et al. |
| 2011/0062821 A1 | 3/2011 | Chang et al. |
| 2011/0082026 A1 | 4/2011 | Sakatani et al. |
| 2011/0094243 A1 | 4/2011 | Carroll et al. |
| 2011/0129363 A1 | 6/2011 | Sakai et al. |
| 2011/0154832 A1 | 6/2011 | Barve et al. |
| 2011/0162388 A1 | 7/2011 | Barve et al. |
| 2011/0168363 A9 | 7/2011 | Reppel et al. |
| 2011/0173993 A1 | 7/2011 | Muller et al. |
| 2011/0182086 A1 | 7/2011 | Mienko et al. |
| 2011/0192836 A1 | 8/2011 | Muller et al. |
| 2011/0218921 A1 | 9/2011 | Addala et al. |
| 2011/0239662 A1 | 10/2011 | Bahl et al. |
| 2011/0284196 A1 | 11/2011 | Zanadi |
| 2011/0302931 A1 | 12/2011 | Sohn |
| 2011/0308258 A1 | 12/2011 | Smith et al. |
| 2011/0314836 A1 | 12/2011 | Heitzler et al. |
| 2012/0031108 A1 | 2/2012 | Kobayashi et al. |
| 2012/0033002 A1 | 2/2012 | Seeler et al. |
| 2012/0036868 A1 | 2/2012 | Heitzler et al. |
| 2012/0045698 A1 | 2/2012 | Shima |
| 2012/0060526 A1 | 3/2012 | May et al. |
| 2012/0079834 A1 | 4/2012 | Dinesen |
| 2012/0222427 A1 | 9/2012 | Hassen |
| 2012/0222428 A1 | 9/2012 | Celik et al. |
| 2012/0266591 A1 | 10/2012 | Morimoto et al. |
| 2012/0266607 A1 | 10/2012 | Morimoto et al. |
| 2012/0267090 A1 | 10/2012 | Kruglick |
| 2012/0272665 A1 | 11/2012 | Watanabe et al. |
| 2012/0272666 A1 | 11/2012 | Watanabe et al. |
| 2012/0285179 A1 | 11/2012 | Morimoto |
| 2012/0291453 A1 | 11/2012 | Watanabe et al. |
| 2013/0019610 A1 | 1/2013 | Zimm et al. |
| 2013/0020529 A1 | 1/2013 | Chang et al. |
| 2013/0104568 A1 | 5/2013 | Kuo et al. |
| 2013/0106116 A1 | 5/2013 | Kuo et al. |
| 2013/0145573 A1 | 6/2013 | Bizhanzadeh |
| 2013/0180263 A1 | 7/2013 | Choi et al. |
| 2013/0186107 A1 | 7/2013 | Shih et al. |
| 2013/0187077 A1 | 7/2013 | Katter |
| 2013/0192269 A1 | 8/2013 | Wang |
| 2013/0199460 A1 | 8/2013 | Duplessis et al. |
| 2013/0200293 A1 | 8/2013 | Zhao et al. |
| 2013/0227965 A1 | 9/2013 | Yagi et al. |
| 2013/0232993 A1 | 9/2013 | Saito et al. |
| 2013/0255279 A1 | 10/2013 | Tomimatsu et al. |
| 2013/0269367 A1 | 10/2013 | Meillan |
| 2013/0298571 A1 | 11/2013 | Morimoto et al. |
| 2013/0300243 A1 | 11/2013 | Gieras et al. |
| 2013/0319012 A1 | 12/2013 | Kuo et al. |
| 2013/0327062 A1 | 12/2013 | Watanabe et al. |
| 2014/0020881 A1 | 1/2014 | Reppel et al. |
| 2014/0075958 A1 | 3/2014 | Takahashi et al. |
| 2014/0116538 A1 | 5/2014 | Tanaka et al. |
| 2014/0157793 A1 | 6/2014 | Johnson et al. |
| 2014/0165594 A1 | 6/2014 | Benedict |
| 2014/0165595 A1 | 6/2014 | Zimm et al. |
| 2014/0190182 A1 | 7/2014 | Benedict |
| 2014/0216057 A1 | 8/2014 | Oezcan |
| 2014/0260373 A1 | 9/2014 | Gerber et al. |
| 2014/0290273 A1 | 10/2014 | Benedict et al. |
| 2014/0290275 A1 | 10/2014 | Muller |
| 2014/0291570 A1 | 10/2014 | Klausner et al. |
| 2014/0305137 A1 | 10/2014 | Benedict |
| 2014/0305139 A1 | 10/2014 | Takahashi et al. |
| 2014/0311165 A1 | 10/2014 | Watanabe et al. |
| 2014/0325996 A1 | 11/2014 | Muller |
| 2014/0366557 A1 | 12/2014 | Mun et al. |
| 2015/0007582 A1 | 1/2015 | Kim et al. |
| 2015/0027133 A1 | 1/2015 | Benedict |
| 2015/0030483 A1 | 1/2015 | Ryu |
| 2015/0033762 A1 | 2/2015 | Cheng et al. |
| 2015/0033763 A1 | 2/2015 | Saito et al. |
| 2015/0047371 A1 | 2/2015 | Hu et al. |
| 2015/0068219 A1 | 3/2015 | Komorowski et al. |
| 2015/0089960 A1 | 4/2015 | Takahashi et al. |
| 2015/0096307 A1 | 4/2015 | Watanabe et al. |
| 2015/0114007 A1 | 4/2015 | Neilson et al. |
| 2015/0168030 A1 | 6/2015 | Leonard et al. |
| 2015/0184903 A1 | 7/2015 | Mun et al. |
| 2015/0211440 A1 | 7/2015 | Joffroy |
| 2015/0260433 A1 | 9/2015 | Choi et al. |
| 2015/0267943 A1 | 9/2015 | Kim et al. |
| 2015/0362224 A1 | 12/2015 | Benedict et al. |
| 2015/0362225 A1 | 12/2015 | Schwartz |
| 2015/0369524 A1 | 12/2015 | Ikegami et al. |
| 2016/0000999 A1 | 1/2016 | Focht et al. |
| 2016/0025385 A1 | 1/2016 | Auringer et al. |
| 2016/0032920 A1 | 2/2016 | Hatami Aghdam |
| 2016/0084544 A1 | 3/2016 | Radermacher et al. |
| 2016/0091227 A1 | 3/2016 | Leonard et al. |
| 2016/0146515 A1 | 5/2016 | Momen et al. |
| 2016/0216012 A1 | 7/2016 | Benedict et al. |
| 2016/0238287 A1 | 8/2016 | Benedict |
| 2016/0273811 A1 | 9/2016 | Smith et al. |
| 2016/0282021 A1 | 9/2016 | Zhao et al. |
| 2016/0298880 A1 | 10/2016 | Humburg |
| 2016/0355898 A1 | 12/2016 | Vieyra Villegas et al. |
| 2016/0356529 A1 | 12/2016 | Humburg |
| 2016/0367982 A1 | 12/2016 | Pennie |
| 2017/0059213 A1 | 3/2017 | Barclay et al. |
| 2017/0059215 A1 | 3/2017 | Watanabe et al. |
| 2017/0071234 A1 | 3/2017 | Garg |
| 2017/0138648 A1 | 5/2017 | Cui et al. |
| 2017/0176083 A1 | 6/2017 | Sul et al. |
| 2017/0309380 A1 | 10/2017 | Benedict et al. |
| 2017/0328603 A1 | 11/2017 | Barclay et al. |
| 2017/0328649 A1 | 11/2017 | Brandmeier |
| 2017/0370624 A1 | 12/2017 | Zimm et al. |
| 2018/0005735 A1 | 1/2018 | Scharf et al. |
| 2018/0023852 A1 | 1/2018 | Schroeder et al. |
| 2018/0045437 A1 | 2/2018 | Vetrovec |
| 2018/0195775 A1* | 7/2018 | Schroeder ............... F25B 21/00 |
| 2018/0252445 A1* | 9/2018 | Ueno ...................... F25B 30/06 |
| 2018/0283740 A1 | 10/2018 | Holladay et al. |
| 2018/0340715 A1 | 11/2018 | Benedict et al. |
| 2019/0206578 A1 | 7/2019 | Wong |

FOREIGN PATENT DOCUMENTS

| | | |
|---|---|---|
| CN | 1977131 A | 6/2007 |
| CN | 101280983 A | 10/2008 |
| CN | 101495818 A | 7/2009 |
| CN | 101842647 A | 9/2010 |
| CN | 101979937 A | 2/2011 |
| CN | 201772566 U | 3/2011 |
| CN | 102165615 A | 8/2011 |
| CN | 101788207 B | 9/2011 |
| CN | 102345942 A | 2/2012 |
| CN | 202432596 U | 9/2012 |
| CN | 103090583 A | 5/2013 |
| CN | 103712401 A | 4/2014 |
| CN | 102077303 B | 4/2015 |
| CN | 106481842 A | 3/2017 |
| CN | 106949673 A | 7/2017 |
| CN | 107003041 A | 8/2017 |
| DE | 804694 C | 4/1951 |
| DE | 1514388 A1 | 6/1969 |
| DE | 102013223959 A1 | 5/2015 |
| DE | 202015106851 U1 | 3/2016 |
| EP | 0187078 A1 | 7/1986 |
| EP | 2071255 A1 | 6/2009 |
| EP | 2108904 A1 | 10/2009 |
| EP | 2215955 A1 | 8/2010 |
| EP | 2322072 A2 | 5/2011 |
| EP | 2420760 A1 | 2/2012 |
| EP | 2813785 A1 | 12/2014 |
| EP | 3306082 A2 | 4/2018 |
| FR | 2935468 A1 | 3/2010 |

(56) References Cited

FOREIGN PATENT DOCUMENTS

| | | | |
|---|---|---|---|
| JP | 59232922 | A | 12/1984 |
| JP | H08166182 | A | 6/1996 |
| JP | 3205196 | B2 | 9/2001 |
| JP | 2002315243 | A | 10/2002 |
| JP | 2007147136 | A | 6/2007 |
| JP | 2007291437 | A | 11/2007 |
| JP | 2008051412 | A | 3/2008 |
| JP | 2010112606 | A | 5/2010 |
| JP | 2010525291 | A | 7/2010 |
| JP | 6212955 | B2 | 12/2014 |
| JP | 2014228216 | A | 12/2014 |
| JP | 5907023 | B2 | 4/2016 |
| JP | 6079498 | B2 | 2/2017 |
| JP | 6191539 | B2 | 9/2017 |
| JP | 2017207222 | A | 11/2017 |
| KR | 101100301 | B1 | 12/2011 |
| KR | 101238234 | B1 | 3/2013 |
| WO | WO0133145 | A1 | 5/2001 |
| WO | WO0212800 | A1 | 2/2002 |
| WO | WO03016794 | A1 | 2/2003 |
| WO | WO2004/068512 | A1 | 8/2004 |
| WO | WO2007/036729 | A1 | 4/2007 |
| WO | WO2007/086638 | A1 | 8/2007 |
| WO | WO2009/024412 | A1 | 2/2009 |
| WO | WO2009/098391 | A1 | 8/2009 |
| WO | WO2010/119591 | A1 | 10/2010 |
| WO | WO2011034594 | A1 | 3/2011 |
| WO | WO2011152179 | A1 | 12/2011 |
| WO | WO2014099199 | A1 | 6/2014 |
| WO | WO2014170447 | A1 | 10/2014 |
| WO | WO2014173787 | A1 | 10/2014 |
| WO | WO2015017230 | A1 | 2/2015 |
| WO | WO2016005774 | A1 | 1/2016 |
| WO | WO2016035267 | A1 | 3/2016 |
| WO | WO2017042266 | A1 | 3/2017 |
| WO | WO2017081048 | A2 | 5/2017 |
| WO | WO2017097989 | A1 | 6/2017 |

OTHER PUBLICATIONS

International Search Report issued in connection with PCT Application No. PCT/US2014/017431 dated May 9, 2014.

International Search Report issued in connection with PCT/US2013/070518, dated Jan. 22, 2014.

Tetsuji Okamura, Performance of a room-temperature rotary magnet refrigerator, dated Nov. 28, 2005, Elsevier.

Journal of Alloys and Compounds, copyright 2008 Elsevier B..V. Evaluation of Ni—Mn—In—Si Alloys for Magnetic Refrigerant Application, Rahul Das, A. Perumal and A. Srinivasan, Dept of Physics, Indian Institute of Technology, Oct. 10, 2011.

Effects of annealing on the magnetic entropy change and exchange bias behavior in melt-spun Ni—Mn—In ribbons, X.Z. Zhao, C.C. Hsieh, et al Science Direct, Scripta Materialia 63 (2010).

PCT International Search Report and Written Opinion issued in connection with PCT Application No. PCT/US2013/070023 dated Feb. 27, 2014.

Barbara Pulko, Epoxy-bonded La—Fe—Co—Si magnetocaloric plates, Journal of Magnetism and Magnetic Materials, 375 (2015) 65-73.

International Search Report of PCT/US2014/047925 dated Nov. 10, 2014.

Andrej Kitanovski, Present and future caloric refrigeration and heat-pump technologies, International Journal of Refrigeration, vol. 57, Sep. 2015, pp. 288-298.

C Aprea, et al., An innovative rotary permanent magnet magnetic refrigerator based on AMR cycle, Thermal Energy Systems: Production, Storage, Utilization and the Environment, dated May 2015, Napoli, Italy, pp. 1-5.

Stefano Dall'Olio, Numerical Simulation of a Tapered Bed AMR, DTU Orbit, Netherlands, 2015, p. 1-2.

International Search Report, PCT Application No. PCT/CN2019/096188, dated Oct. 15, 2019, 5 pages.

International Search Report, PCT Application No. PCT/CN2019/096187, dated Sep. 30, 2019, 4 pages.

\* cited by examiner

CALORIC HEAT PUMP HYDRAULIC SYSTEM

FIELD OF THE INVENTION

The present subject matter relates generally to caloric heat pump hydraulic systems.

BACKGROUND OF THE INVENTION

Conventional refrigeration technology typically utilizes a heat pump that relies on compression and expansion of a fluid refrigerant to receive and reject heat in a cyclic manner so as to effect a desired temperature change or transfer heat energy from one location to another. This cycle can be used to receive heat from a refrigeration compartment and reject such heat to the environment or a location that is external to the compartment. Other applications include air conditioning of residential or commercial structures. A variety of different fluid refrigerants have been developed that can be used with the heat pump in such systems.

While improvements have been made to such heat pump systems that rely on the compression of fluid refrigerant, at best such can still only operate at about forty-five percent or less of the maximum theoretical Carnot cycle efficiency. Also, some fluid refrigerants have been discontinued due to environmental concerns. The range of ambient temperatures over which certain refrigerant-based systems can operate may be impractical for certain locations. Other challenges with heat pumps that use a fluid refrigerant exist as well.

Magneto-caloric materials (MCMs), i.e. materials that exhibit the magneto-caloric effect, provide a potential alternative to fluid refrigerants for heat pump applications. In general, the magnetic moments of MCMs become more ordered under an increasing, externally applied magnetic field and cause the MCMs to generate heat. Conversely, decreasing the externally applied magnetic field allows the magnetic moments of the MCMs to become more disordered and allow the MCMs to absorb heat. Some MCMs exhibit the opposite behavior, i.e. generating heat when the magnetic field is removed (which are sometimes referred to as para-magneto-caloric material but both types are referred to collectively herein as magneto-caloric material or MCM). The theoretical Carnot cycle efficiency of a refrigeration cycle based on an MCMs can be significantly higher than for a comparable refrigeration cycle based on a fluid refrigerant. As such, a heat pump system that can effectively use an MCM would be useful.

Challenges exist to the practical and cost competitive use of an MCM, however. In addition to the development of suitable MCMs, equipment that can attractively utilize an MCM is still needed. Currently proposed equipment may require relatively large and expensive magnets, may be impractical for use in e.g., appliance refrigeration, and may not otherwise operate with enough efficiency to justify capital cost.

Accordingly, a heat pump system that can address certain challenges, such as those identified above, would be useful. Such a heat pump system that can also be used in a refrigerator appliance would also be useful.

BRIEF DESCRIPTION OF THE INVENTION

Aspects and advantages of the invention will be set forth in part in the following description, or may be apparent from the description, or may be learned through practice of the invention.

In an example embodiment, a refrigerator appliance includes a cabinet defining a fresh food chamber and a freezer chamber. A hot side heat exchanger is positioned outside of the fresh food chamber and the freezer chamber of the cabinet. A fresh food cold side heat exchanger is positioned within the cabinet at the fresh food chamber. The fresh food chamber is chillable with air from the fresh food cold side heat exchanger. A freezer cold side heat exchanger is positioned within the cabinet at the freezer chamber. The freezer chamber is chillable with air from the freezer cold side heat exchanger. A fresh food regenerator includes a first caloric material stage and a second caloric material stage. A freezer regenerator includes a first caloric material stage and a second caloric material stage. The first and second caloric material stages of the freezer regenerator are separate from the first and second caloric material stages of the fresh food regenerator. A fresh food working fluid circuit couples the hot side heat exchanger, the fresh food cold side heat exchanger and the fresh food regenerator such that a first working fluid is flowable through the hot side heat exchanger, the fresh food cold side heat exchanger and the fresh food regenerator via the fresh food working fluid circuit. A first pair of diverter valves is coupled to the fresh food working fluid circuit. The first pair of diverter valves is configured for selectively changing a flow direction of the first working fluid through the first caloric material stage and the second caloric material stage of the fresh food regenerator. A hot side reservoir is coupled to the fresh food working fluid circuit. The hot side reservoir is sized for containing a volume of the first working fluid. The hot side reservoir is positioned outside of the fresh food chamber and the freezer chamber of the cabinet. The hot side reservoir is positioned below one or both of the first pair of diverter valves. A freezer working fluid circuit couples the freezer cold side heat exchanger and the freezer regenerator such that a second working fluid is flowable through the freezer cold side heat exchanger and the freezer regenerator via the freezer working fluid circuit. A second pair of diverter valves is coupled to the freezer working fluid circuit. The second pair of diverter valves is configured for selectively changing a flow direction of the second working fluid through the first caloric material stage and the second caloric material stage of the freezer regenerator. A fresh food cold side reservoir is coupled to the freezer working fluid circuit. The fresh food cold side reservoir is sized for containing a volume of the second working fluid. The fresh food cold side reservoir is positioned within the cabinet at the fresh food chamber. The fresh food cold side reservoir is positioned below one or both of the second pair of diverter valves. A liquid-liquid heat exchanger is coupled to the fresh food working fluid circuit such that the first working fluid is flowable through the liquid-liquid heat exchanger. The liquid-liquid heat exchanger is positioned at the fresh food cold side reservoir such the liquid-liquid heat exchanger is configured for exchanging heat between the first working fluid in the liquid-liquid heat exchanger and the second working fluid in the fresh food cold side reservoir.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present subject matter is directed to caloric heat pump systems for heating or cooling an appliance, such as a refrigerator appliance. While described in greater detail below in the context of a magneto-caloric heat pump system, one of skill in the art using the teachings herein will recognize that other suitable caloric materials may be used in a similar manner to heat or cool an appliance, i.e., apply a field, move heat, remove the field, move heat. For example, electro-caloric material heats up and cools down within increasing and decreasing electric fields. As another example, elasto-caloric material heats up and cools down when exposed to increasing and decreasing mechanical strain. As yet another example, baro-caloric material heats up and cools down when exposed to increasing and decreasing pressure. Such materials and other similar caloric materials may be used in place of or in addition to the magneto-caloric material described below to heat or cool fluid within an appliance. Thus, caloric material is used broadly herein to encompass materials that undergo heating or cooling when exposed to a changing field from a field generator, where the field generator may be a magnet, an electric field generator, an actuator for applying mechanical stress or pressure, etc.

Figure 1:
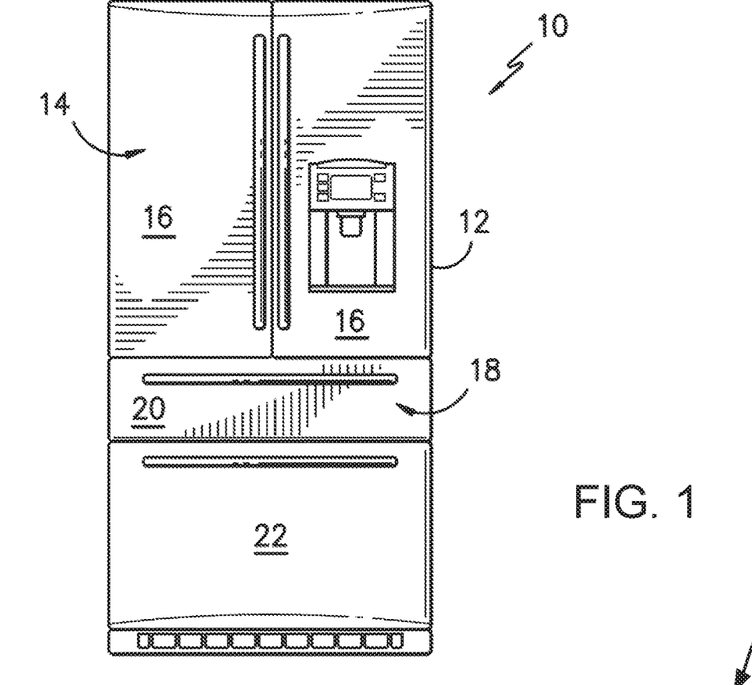
FIG. 1 is a refrigerator appliance in accordance with an example embodiment of the present disclosure.

Referring now to FIG. 1, an example embodiment of a refrigerator appliance 10 is depicted as an upright refrigerator having a cabinet or casing 12 that defines a number of internal storage compartments or chilled chambers. In particular, refrigerator appliance 10 includes upper fresh-food compartments 14 having doors 16 and lower freezer compartment 18 having upper drawer 20 and lower drawer 22. Drawers 20, 22 are "pull-out" type drawers in that they can be manually moved into and out of freezer compartment 18 on suitable slide mechanisms. Refrigerator 10 is provided by way of example only. Other configurations for a refrigerator appliance may be used as well including appliances with only freezer compartments, only chilled compartments, or other combinations thereof different from that shown in FIG. 1. In addition, the heat pump and heat pump system of the present disclosure is not limited to refrigerator appliances and may be used in other applications as well such as e.g., air-conditioning, electronics cooling devices, and others. Thus, it should be understood that while the use of a heat pump and heat pump system to provide cooling within a refrigerator is provided by way of example herein, the present disclosure may also be used to provide for heating applications as well.

Figure 2:
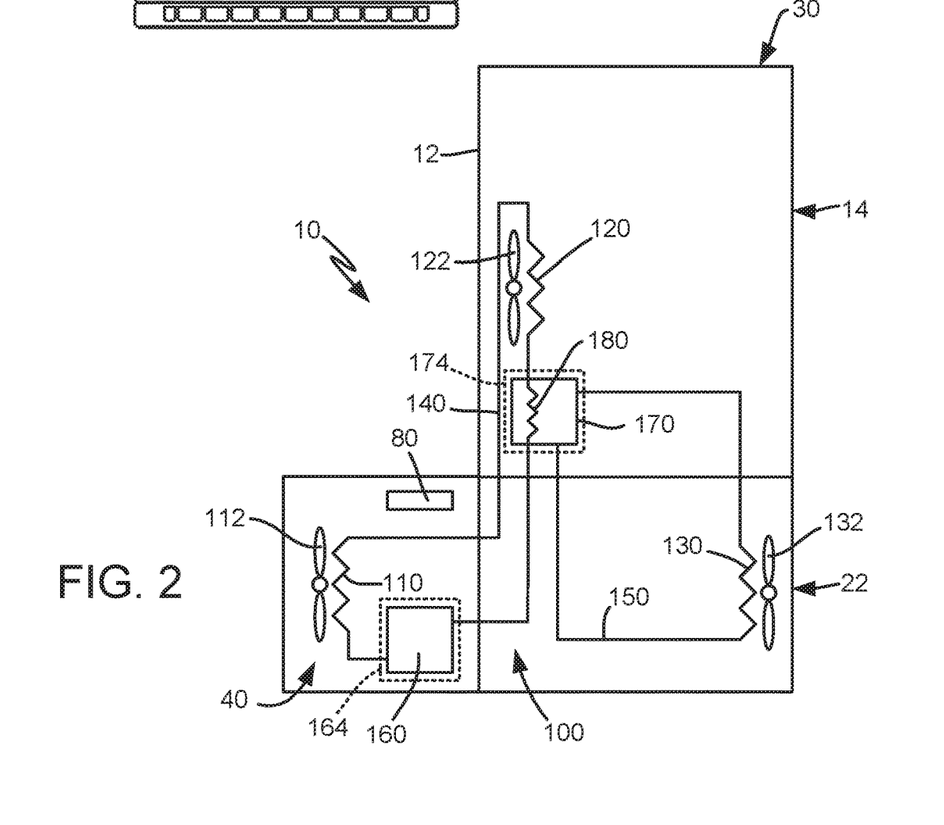
FIG. 2 is a schematic view of certain components of a heat pump system positioned in the example refrigerator appliance of FIG. 1.

FIG. 2 is a schematic view of various components of refrigerator appliance 10, including refrigeration compartments 30 (e.g., fresh-food compartments 14 and freezer compartment 18) and a machinery compartment 40. Refrigeration compartment 30 and machinery compartment 40 include a heat pump system 100 with a hot side heat exchanger 110. Hot side heat exchanger 110 is positioned outside of refrigeration compartments 30, e.g., in machinery compartment 40 for the rejection of heat thereto. A heat transfer fluid such as e.g., an aqueous solution, flowing within hot side heat exchanger 110 rejects heat to machinery compartment 40 thereby cooling the heat transfer fluid in hot side heat exchanger 110. Air around hot side heat exchanger 110 may be circulated (e.g., with a fan 112) within machinery compartment 40 to improve the rate of heat transfer between the heat transfer fluid in hot side heat exchanger 110 and the air in machinery compartment 40.

A fresh food cold side heat exchanger 120 is positioned in fresh-food compartment 14 for the removal of heat therefrom. Heat transfer fluid such as e.g., an aqueous solution, flowing within fresh food heat exchanger 120 receives heat from fresh-food compartment 14 thereby cooling contents of fresh-food compartment 14. In particular, air around fresh food heat exchanger 120 may be circulated (e.g., with a fresh food fan 122) within fresh-food compartment 14 such that the air from fresh food heat exchanger 120 cools fresh-food compartment 14. Fresh food fan 122 may thus be used to create a flow of air across fresh food heat exchanger 120 and thereby improve the rate of heat transfer. As may be seen from the above, operation of heat pump system 100 and fresh food fan 122 allows fresh food heat exchanger 120 to cool fresh-food compartment 14, e.g., to about thirty-two degrees Fahrenheit (32° F.).

As may be seen in FIG. 2, heat pump system 100 also has a freezer cold side heat exchanger 130. Freezer heat exchanger 130 may operate in parallel with fresh food heat exchanger 120. Thus, e.g., freezer heat exchanger 130 is positioned in freezer compartment 18 for the removal of heat therefrom. Heat transfer fluid such as e.g., an aqueous solution, flowing within freezer heat exchanger 130 receives heat from freezer compartment 18 thereby cooling contents of freezer compartment 18. In particular, air around freezer heat exchanger 130 may be circulated (e.g., with a freezer fan 132) within freezer compartment 18 such that the air from freezer heat exchanger 130 cools freezer compartment 18. Freezer fan 132 may thus be used to create a flow of air across freezer heat exchanger 130 and thereby improve the rate of heat transfer. As may be seen from the above, operation of heat pump system 100 and freezer fan 132 allow chilled air from freezer heat exchanger 130 to cool freezer compartment 18, e.g., to about negative ten degrees Fahrenheit (−10° F.).

A fresh food working fluid circuit 140 connects hot side heat exchanger 110, fresh food heat exchanger 120 and other components of heat pump system 100, including a hot side reservoir 160. Thus, the heat transfer fluid within fresh food working fluid circuit 140 may flow between hot side heat exchanger 110, fresh food heat exchanger 120, hot side reservoir 160, etc. within fresh food working fluid circuit 140. Fresh food working fluid circuit 140 may include suitable conduits for fluidly connecting components, such as pipes, tubes, lines, etc. in order to allow the heat transfer fluid to flow between, inter alia, hot side heat exchanger 110, fresh food heat exchanger 120 and hot side reservoir 160.

A freezer working fluid circuit 150 connects freezer heat exchanger 130 and other components of heat pump system 100, including a fresh food cold side reservoir 170. Thus, the heat transfer fluid within freezer working fluid circuit 150 may flow between freezer heat exchanger 130 and fresh food reservoir 170, etc. within freezer working fluid circuit 150. Freezer working fluid circuit 150 may include suitable conduits for fluidly connecting components, such as pipes, tubes, lines, etc. in order to allow the heat transfer fluid to flow between, inter alia, freezer heat exchanger 130 and fresh food reservoir 170. Freezer working fluid circuit 150 may be separate from fresh food working fluid circuit 140, e.g., such that the heat transfer fluid within fresh food working fluid circuit 140 does not mix with the heat transfer fluid within freezer working fluid circuit 150.

Refrigerator appliance 10 may include a controller 80 that regulates various components of refrigerator appliance 10. Thus, controller 80 may be in operative communication with various components of refrigerator appliance 10, such as fans 112, 122, 132, a motor 102 (FIG. 3), etc. Controller 80 may include memory and one or more processing devices such as microprocessors, CPUs or the like, such as general or special purpose microprocessors operable to execute programming instructions or micro-control code associated with operation of refrigerator appliance 10. The memory can be non-transitory and represent random access memory such as DRAM, or read only memory such as ROM or FLASH. The processor executes programming instructions stored in the memory. The memory can be a separate component from the processor or can be included onboard within the processor. Alternatively, controller 80 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Controller 80 may communicate with various components of refrigerator appliance 10 via a suitable wiring harness or communications bus.

Figure 3:
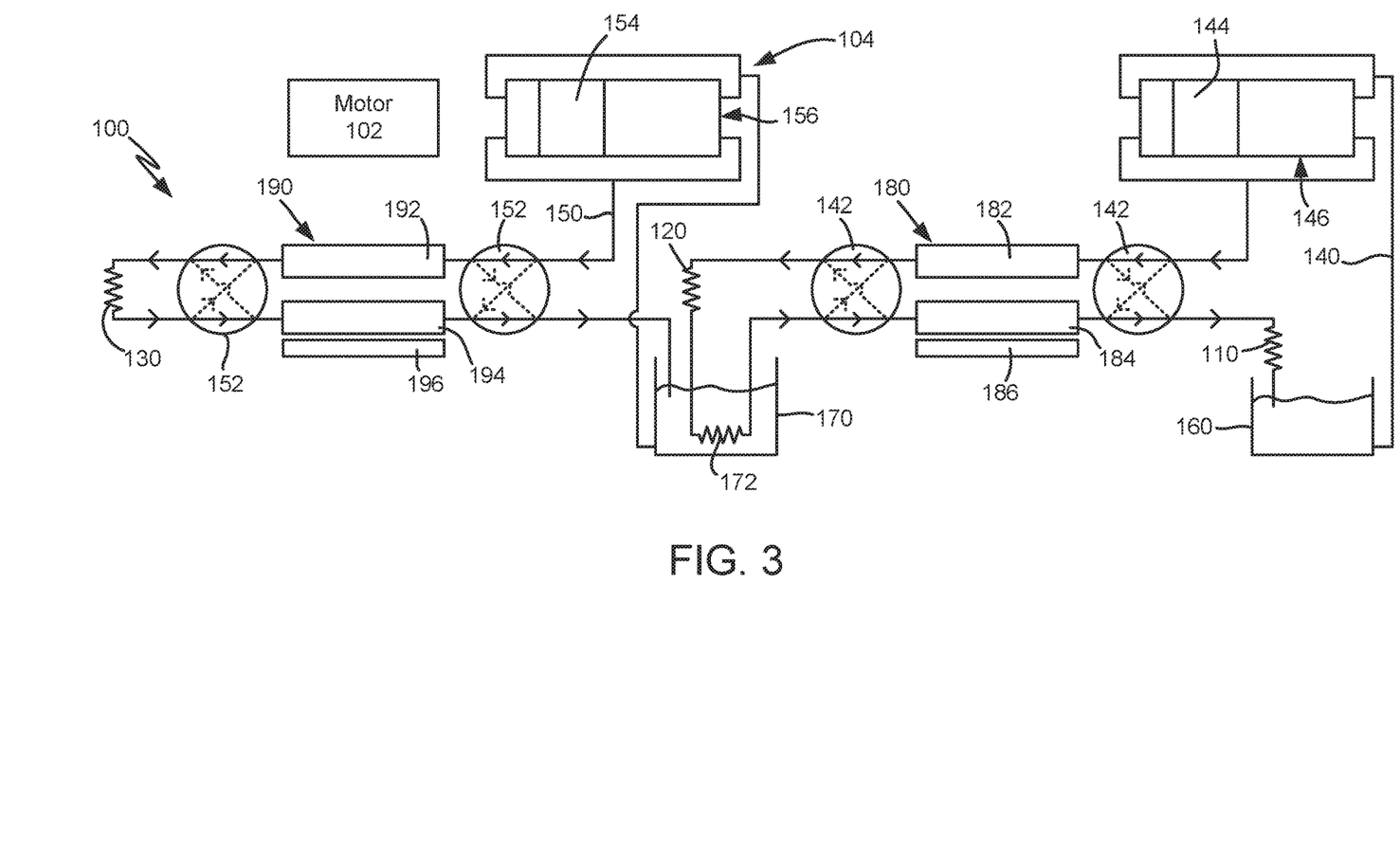
FIG. 3 is a schematic view of the heat pump system of FIG. 2.

FIG. 3 is a schematic view of heat pump system 100. As may be seen in FIG. 3, heat pump system 100 includes a fresh food regenerator 180 with a first caloric material stage 182 and a second caloric material stage 184. First and second caloric material stages 182, 184 of fresh food regenerator 180 include a magneto-caloric material that exhibit the magneto-caloric effect. Thus, e.g., when first caloric material stage 182 of fresh food regenerator 180 is positioned within a magnetic field from a magnet 186, first caloric material stage 182 may increase in temperature and thereby heat transfer fluid flowing through first caloric material stage 182. Conversely, when the magnetic field from magnet 186 is removed from first caloric material stage 182 of fresh food regenerator 180, first caloric material stage 182 may decrease in temperature and heat transfer fluid flowing through first caloric material stage 182 may reject heat to first caloric material stage 182. Heat pump system 100 may include a motor, such as motor 102, coupled to fresh food regenerator 180 and/or magnet 186 to provide relative motion between fresh food regenerator 180 and magnet 186. Thus, the motor may be operable to sequentially move first and second caloric material stages 182, 184 of fresh food regenerator 180 into and out of the magnetic field from magnet 186.

Heat pump system 100 also includes a freezer regenerator 190 with a first caloric material stage 192 and a second caloric material stage 194. First and second caloric material stages 192, 194 of freezer regenerator 190 include a magneto-caloric material that exhibit the magneto-caloric effect. Thus, e.g., when first caloric material stage 192 of freezer regenerator 190 is positioned within a magnetic field from a magnet 196, first caloric material stage 192 may increase in temperature and thereby heat transfer fluid flowing through first caloric material stage 192. Conversely, when the magnetic field from magnet 196 is removed from first caloric material stage 192 of freezer regenerator 190, first caloric material stage 192 may decrease in temperature and heat transfer fluid flowing through first caloric material stage 192 may reject heat to first caloric material stage 192. Heat pump system 100 may include a motor, such as motor 102, coupled to freezer regenerator 190 and/or magnet 196 to provide relative motion between freezer regenerator 190 and magnet 196. Thus, the motor may be operable to sequentially move first and second caloric material stages 192, 194 of freezer regenerator 190 into and out of the magnetic field from magnet 196.

The one or more magneto-caloric material(s) in fresh food regenerator 180 and freezer regenerator 190 may be different. For example, the magneto-caloric materials in fresh food regenerator 180 may be selected to cool fresh-food compartment 14, e.g., to about thirty-two degrees Fahrenheit (32° F.). Conversely, the magneto-caloric materials in freezer regenerator 190 may be selected to cool freezer compartment 18, e.g., to about negative ten degrees Fahrenheit (−10° F.). In addition, while only shown with two caloric material stages in FIG. 3, it will be understood that each of fresh food regenerator 180 and freezer regenerator 190 may include three (or more) caloric material stages in alternative example embodiments.

As shown in FIG. 3, heat pump system 100 includes a first pair of diverter valves 142 coupled to fresh food working fluid circuit 140 and a second pair of diverter valves 152 coupled to freezer working fluid circuit 150. First and second diverter valves 142, 152 may be coupled to motor 102 such that motor 102 is operable to adjust first and second diverter valves 142, 152, e.g., in a synchronized manner with the relative motion between fresh food regenerator 180 and magnet 186 and/or with the relative motion between freezer regenerator 190 and magnet 196.

The first diverter valves 142 are configured for selectively changing a flow direction of the heat transfer fluid within fresh food working fluid circuit 140 through first and second caloric material stages 182, 184 of fresh food regenerator 180. In particular, a first actuation flow path through first diverter valves 142 is shown with black lines in FIG. 3, and a second actuation flow path through first diverter valves 142 is shown with dashed lines in FIG. 3. As may be seen from the above, first diverter valves 142 may flow the heat transfer fluid from hot side reservoir 160 through either the first and second caloric material stages 182, 184 of fresh food regenerator 180, e.g., depending upon which one of the first and second caloric material stages 182, 184 of fresh food regenerator 180 is within the magnetic field of magnet 186. In particular, first diverter valves 142 may be shifted to the first actuation flow path when first caloric material stage 182 of fresh food regenerator 180 is positioned outside of the magnetic field of magnet 186 and second caloric material stage 184 of fresh food regenerator 180 is positioned within the magnetic field of magnet 186. Conversely, first diverter valves 142 may be shifted to the second actuation flow path when first caloric material stage 182 of fresh food regenerator 180 is positioned within the magnetic field of magnet 186 and second caloric material stage 184 of fresh food regenerator 180 is positioned outside of the magnetic field of magnet 186.

In a similar manner, the second diverter valves 152 are configured for selectively changing a flow direction of the heat transfer fluid within freezer working fluid circuit 150 through first and second caloric material stages 192, 194 of freezer regenerator 190. In particular, a first actuation flow path through second diverter valves 152 is shown with black lines in FIG. 3, and a second actuation flow path through second diverter valves 152 is shown with dashed lines in FIG. 3. As may be seen from the above, second diverter valves 152 may flow the heat transfer fluid from fresh food reservoir 170 through either the first and second caloric material stages 192, 194 of freezer regenerator 190, e.g., depending upon which one of the first and second caloric material stages 192, 194 of fresh freezer regenerator 190 is within the magnetic field of magnet 196. In particular, second diverter valves 152 may be shifted to the first actuation flow path when first caloric material stage 192 of freezer regenerator 190 is positioned outside of the magnetic field of magnet 196 and second caloric material stage 194 of freezer regenerator 190 is positioned within the magnetic field of magnet 196. Conversely, second diverter valves 152 may be shifted to the second actuation flow path when first caloric material stage 192 of freezer regenerator 190 is positioned within the magnetic field of magnet 196 and second caloric material stage 194 of freezer regenerator 190 is positioned outside of the magnetic field of magnet 196.

A liquid-liquid heat exchanger 172 is connected to fresh food working fluid circuit 140. Thus, the heat transfer fluid within fresh food working fluid circuit 140 flows through liquid-liquid heat exchanger 172. As an example, liquid-liquid heat exchanger 172 may be positioned downstream of fresh food heat exchanger 120 and upstream of fresh food regenerator 180 on fresh food working fluid circuit 140. Liquid-liquid heat exchanger 172 is thermally coupled to fresh food reservoir 170. For example, liquid-liquid heat exchanger 172 may be submerged within the heat transfer fluid of freezer working fluid circuit 150 in fresh food reservoir 170.

Working fluid flow through fresh food working fluid circuit 140 will now be described in greater detail below. As may be seen in FIG. 3, fresh food working fluid circuit 140 connects hot side heat exchanger 110, fresh food heat exchanger 120, hot side reservoir 160 and fresh food regenerator 180. Thus, heat transfer fluid may flow between hot side heat exchanger 110, fresh food heat exchanger 120, hot side reservoir 160 and fresh food regenerator 180 through fresh food working fluid circuit 140. In particular, a pump 104 may urge the heat transfer fluid in fresh food working fluid circuit 140 to flow between hot side heat exchanger 110, fresh food heat exchanger 120, hot side reservoir 160 and fresh food regenerator 180, as described in greater detail below. Arrows are provided on fresh food working fluid circuit 140 in FIG. 3 to show the direction of heat transfer fluid flow through fresh food working fluid circuit 140.

As noted above, the heat transfer fluid within fresh food heat exchanger 120 receives heat from fresh-food compartment 14 thereby cooling contents of fresh-food compartment 14. Thus, the air in fresh-food compartment 14 may reject heat to the heat transfer fluid within fresh food heat exchanger 120. The heat transfer fluid flows out of fresh food heat exchanger 120 by fresh food working fluid circuit 140 to liquid-liquid heat exchanger 172 thermally coupled to fresh food reservoir 170. The working fluid from fresh food heat exchanger 120 within liquid-liquid heat exchanger 172 receives heat from the heat transfer fluid of freezer working fluid circuit 150 within fresh food reservoir 170. Thus, the heat transfer fluid from fresh food heat exchanger 120 receives additional heat from the heat transfer fluid of freezer working fluid circuit 150 within fresh food reservoir 170.

The heat transfer fluid then flows out of liquid-liquid heat exchanger 172 via fresh food working fluid circuit 140 to fresh food regenerator 180. In particular, the heat transfer fluid from liquid-liquid heat exchanger 172 may flow into the one of first and second caloric material stages 182, 184 of fresh food regenerator 180 that is within the magnetic field of magnet 186. Thus, the heat transfer fluid from liquid-liquid heat exchanger 172 flowing through fresh food regenerator 180 receives additional heat from magneto-caloric material (MCM) in fresh food regenerator 180. The heat transfer fluid carries this heat through fresh food working fluid circuit 140 to hot side heat exchanger 110. In hot side heat exchanger 110, the heat in the transfer fluid is released to the environment, machinery compartment 40, and/or other location external to refrigeration compartments 30.

From hot side heat exchanger 110, the heat transfer fluid flows into hot side reservoir 160. Within hot side reservoir 160, the heat transfer fluid in fresh food working fluid circuit 140 may reject heat to the environment, machinery compartment 40, etc. due to the placement of hot side reservoir 160, e.g., within machinery compartment 40. Thus, hot side reservoir 160 may assist with tight temperature control of heat transfer fluid returning to fresh food regenerator 180.

From hot side reservoir 160, the heat transfer fluid returns by fresh food working fluid circuit 140 to fresh food regenerator 180. In particular, the heat transfer fluid from hot side reservoir 160 may flow into the one of first and second caloric material stages 182, 184 of fresh food regenerator 180 that is outside of the magnetic field of magnet 186. Thus, the heat transfer fluid from hot side reservoir 160 flowing through fresh food regenerator 180 rejects heat to magneto-caloric material (MCM) in fresh food regenerator 180. The now colder heat transfer fluid flows through fresh food working fluid circuit 140 to fresh food heat exchanger 120 to receive heat from fresh-food compartment 14 and repeat the cycle as just described.

Working fluid flow through freezer working fluid circuit 150 is similar to that described above for fresh food working fluid circuit 140 and will now be described in greater detail below. As may be seen in FIG. 3, freezer working fluid circuit 150 connects freezer heat exchanger 130, fresh food reservoir 170 and freezer regenerator 190. Thus, heat transfer fluid may flow between freezer heat exchanger 130, fresh food reservoir 170 and freezer regenerator 190 through freezer working fluid circuit 150. In particular, pump 104 may urge the heat transfer fluid in freezer working fluid circuit 150 to flow between freezer heat exchanger 130, fresh food reservoir 170 and freezer regenerator 190, as described in greater detail below. Arrows are provided on freezer working fluid circuit 150 in FIG. 3 to show the direction of heat transfer fluid flow through freezer working fluid circuit 150.

As noted above, the heat transfer fluid within freezer heat exchanger 130 receives heat from freezer compartment 18 thereby cooling contents of fresh-food compartment 14. Thus, the air in freezer compartment 18 may reject heat to the heat transfer fluid within freezer heat exchanger 130. The heat transfer fluid flows out of freezer heat exchanger 130 by freezer working fluid circuit 150 to freezer regenerator 190. In particular, the heat transfer fluid from freezer heat exchanger 130 may flow into the one of first and second caloric material stages 192, 194 of freezer regenerator 190 that is within the magnetic field of magnet 196. Thus, the heat transfer fluid from freezer heat exchanger 130 flowing through freezer regenerator 190 receives additional heat from magneto-caloric material (MCM) in freezer regenerator 190. The heat transfer fluid carries this heat through freezer working fluid circuit 150 to fresh food reservoir 170. In fresh food reservoir 170, the heat in the transfer fluid is rejected to the working fluid in fresh food working fluid circuit 140 via liquid-liquid heat exchanger 172 and/or to the air within fresh-food compartment 14 due to the placement of fresh food reservoir 170 within fresh-food compartment 14. Thus, fresh food reservoir 170 may assist with tight temperature control of heat transfer fluid returning to freezer regenerator 190.

The heat transfer fluid then flows out of fresh food reservoir 170 by freezer working fluid circuit 150 to back to freezer regenerator 190. In particular, the heat transfer fluid from fresh food reservoir 170 may flow into the one of first and second caloric material stages 192, 194 of freezer regenerator 190 that is outside of the magnetic field of magnet 196. Thus, the heat transfer fluid from fresh food reservoir 170 flowing through freezer regenerator 190 rejects heat to magneto-caloric material (MCM) in freezer regenerator 190. The now colder heat transfer fluid flows through freezer working fluid circuit 150 to freezer heat exchanger 130 to receive heat from freezer compartment 18 and repeat the cycle as just described.

The flow of heat transfer fluid in heat pump system 100 described above is provided by way of example only. Other configurations of heat pump system 100 may be used as well. For example, the illustrated lines of fresh food and freezer working fluid circuits 140, 150 provide fluid communication between the various components of heat pump system 100 in FIG. 3 but other heat transfer fluid recirculation loops with different lines and connections may also be employed. Still other configurations of heat pump system 100 may be used as well.

As noted above, hot side reservoir 160 is coupled to fresh food working fluid circuit 140 and is positioned outside of refrigeration compartments 30, e.g., within machinery compartment 40. Hot side reservoir 160 is sized for containing a volume of the heat transfer fluid of fresh food working fluid circuit 140. The volume of the heat transfer fluid from fresh food working fluid circuit 140 within hot side reservoir 160 may assist with providing leak resilience and a simple system, and the size of hot side reservoir 160 may be selected to provide such benefits. For example, hot side reservoir 160 may be sized to hold no less than one hundred and fifty milliliters (150 mL) of heat transfer fluid. In particular, hot side reservoir 160 may be sized to hold no less than five hundred milliliters (500 mL) of heat transfer fluid. Such sizing is advantageous, e.g., because the heat transfer fluid within hot side reservoir 160 may dwell within machinery compartment 40 and thereby maintain a suitable temperature and/or may provide a suitable area for catching leaking fluid.

Hot side reservoir 160 may be positioned below one or both of first diverter valves 142. In particular, hot side reservoir 160 may be positioned below first diverter valves 142 to recapture leakage of the heat transfer fluid from first diverter valves 142. To assist with recapturing leakage, first diverter valves 142, hot side reservoir 160 and/or fresh food regenerator 180 may be positioned within a hermetic shell 164 (FIG. 2). In certain example embodiments, the inner surface of hermetic shell 164 may form reservoir 160.

As noted above, fresh food reservoir 170 is coupled to freezer working fluid circuit 150 and is positioned within of fresh-food compartment 14. Fresh food reservoir 170 is sized for containing a volume of the heat transfer fluid of freezer working fluid circuit 150. The volume of the heat transfer fluid from freezer working fluid circuit 150 within fresh food reservoir 170 may assist with providing leak resilience and a simple system, and the size of fresh food reservoir 170 may be selected to provide such benefits. For example, fresh food reservoir 170 may be sized to hold no less than one hundred and fifty milliliters (150 mL) of heat transfer fluid. In particular, fresh food reservoir 170 may be sized to hold no less than five hundred milliliters (500 mL) of heat transfer fluid. Such sizing is advantageous, e.g., because the heat transfer fluid within fresh food reservoir 170 may dwell within fresh-food compartment 14 and thereby maintain a suitable temperature and/or may provide a suitable area for catching leaking fluid.

Fresh food reservoir 170 may be positioned below one or both of second diverter valves 152. In particular, fresh food reservoir 170 may be positioned below second diverter valves 152 to recapture leakage of the heat transfer fluid from second diverter valves 152. To assist with recapturing leakage, second diverter valves 152, fresh food reservoir 170 and/or freezer regenerator 190 may be positioned within a hermetic shell 174 (FIG. 2). In certain example embodiments, the inner surface of hermetic shell 174 may form fresh food reservoir 170.

As shown in FIG. 3, pump 104 may be connected to fresh food working fluid circuit 140 and freezer working fluid circuit 150. Pump 104 is operable to flow heat transfer fluid through fresh food working fluid circuit 140 and to flow heat transfer fluid through freezer working fluid circuit 150. Pump 104 may include a first piston 144 coupled to fresh food working fluid circuit 140 and a second piston 154 coupled to freezer working fluid circuit 150. First and second pistons 144, 154 may be connected to motor 102 such that first and second pistons 144, 154 are drivable by a common motor, e.g., and such that reciprocation of first and second pistons 144, 154 is synchronized. In alternative example embodiments, first and second pistons 144, 154 may be driven by separate motors, e.g., such that first and second pistons 144, 154 may reciprocate independently. First piston 144 may be positioned within a double-acting cylinder 146 connected to fresh food working fluid circuit 140, and second piston 154 may be positioned within a double-acting cylinder 156 connected to freezer working fluid circuit 150. Double-acting cylinders 146, 156 may allow efficient pumping of heat transfer fluid through fresh food and freezer working fluid circuits 140, 150. In alternative example embodiments, pump 104 may include single-acting cylinders or another positive displacement pump design.

Figure 4:
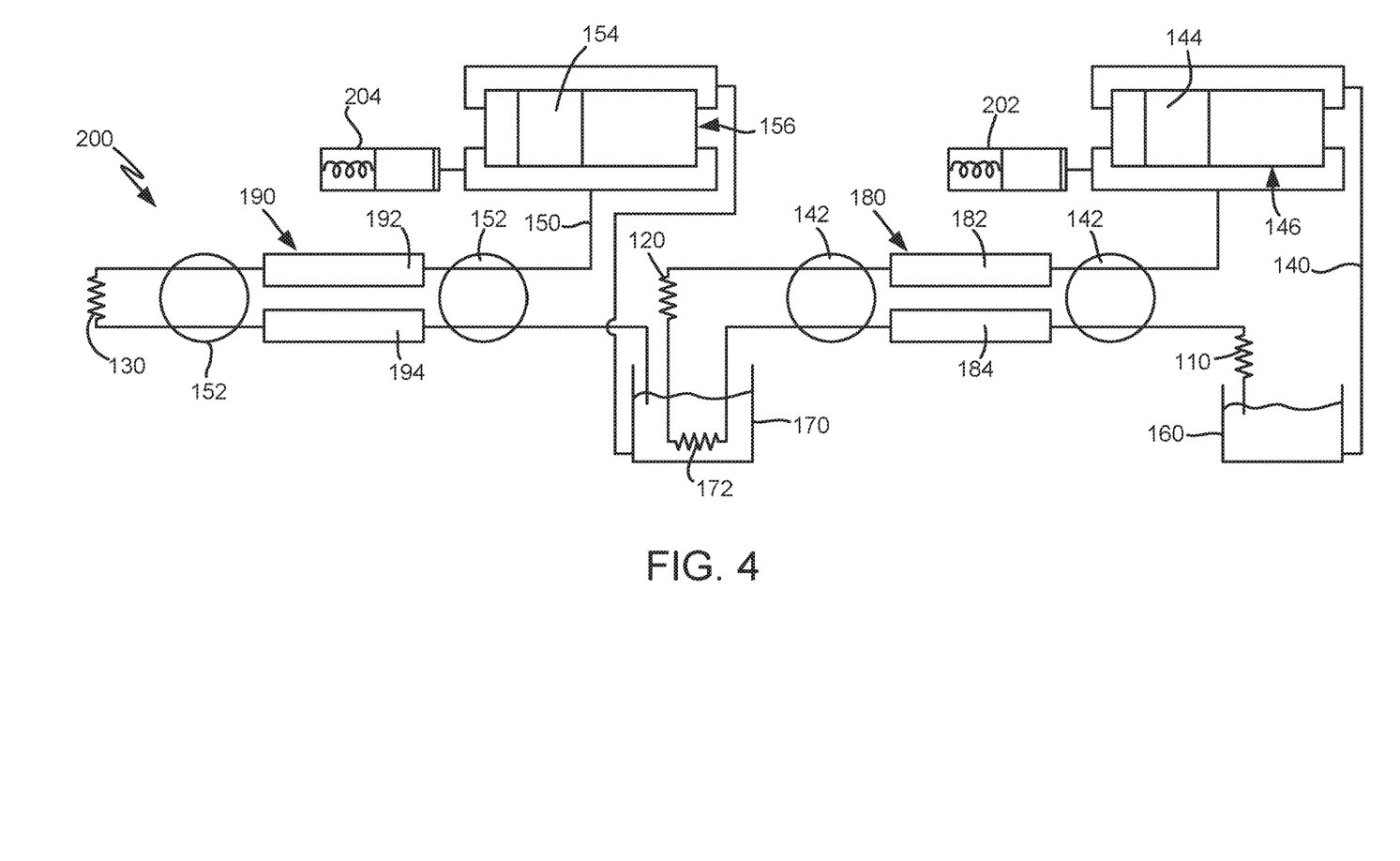
FIG. 4 is a schematic view of a heat pump system according to another example embodiment of the present subject matter.

FIG. 4 is a schematic view of a heat pump system 200 according to another example embodiment of the present subject matter. Heat pump system 200 may be used in or with any suitable appliance, such as refrigerator appliance 100. Thus, heat pump system 200 is described in greater detail below in the context of refrigerator appliance 100. Heat pump system 200 include numerous common components with heat pump system 100 (FIG. 3) and operates in the same or similar manner. However, heat pump system 200 includes additional components as described below.

As shown in FIG. 4, heat pump system 200 includes a first flow damper 202 coupled to fresh food working fluid circuit 140 and a second flow damper 204 coupled to freezer working fluid circuit 150. First flow damper 202 is configured to dampen pressure and flow spikes of the heat transfer fluid in fresh food working fluid circuit 140. Similarly, second flow damper 204 is configured to dampen pressure and flow spikes of the heat transfer fluid in freezer working fluid circuit 150. Thus, e.g., first and second flow dampers 202, 204 may elastically move or deform to regulate and smooth out the flow profile of working fluid, e.g., which will have a slight pulsing quality without first and second flow dampers 202, 204. Such pulsations may disrupt the thermodynamic cycle in fresh food regenerator 180 and/or freezer regenerator 190. Each of first and second flow dampers 202, 204 may be a spring-loaded piston (as shown in FIG. 4), a flexible tube, a flexible diaphragm, etc.

Figure 5:
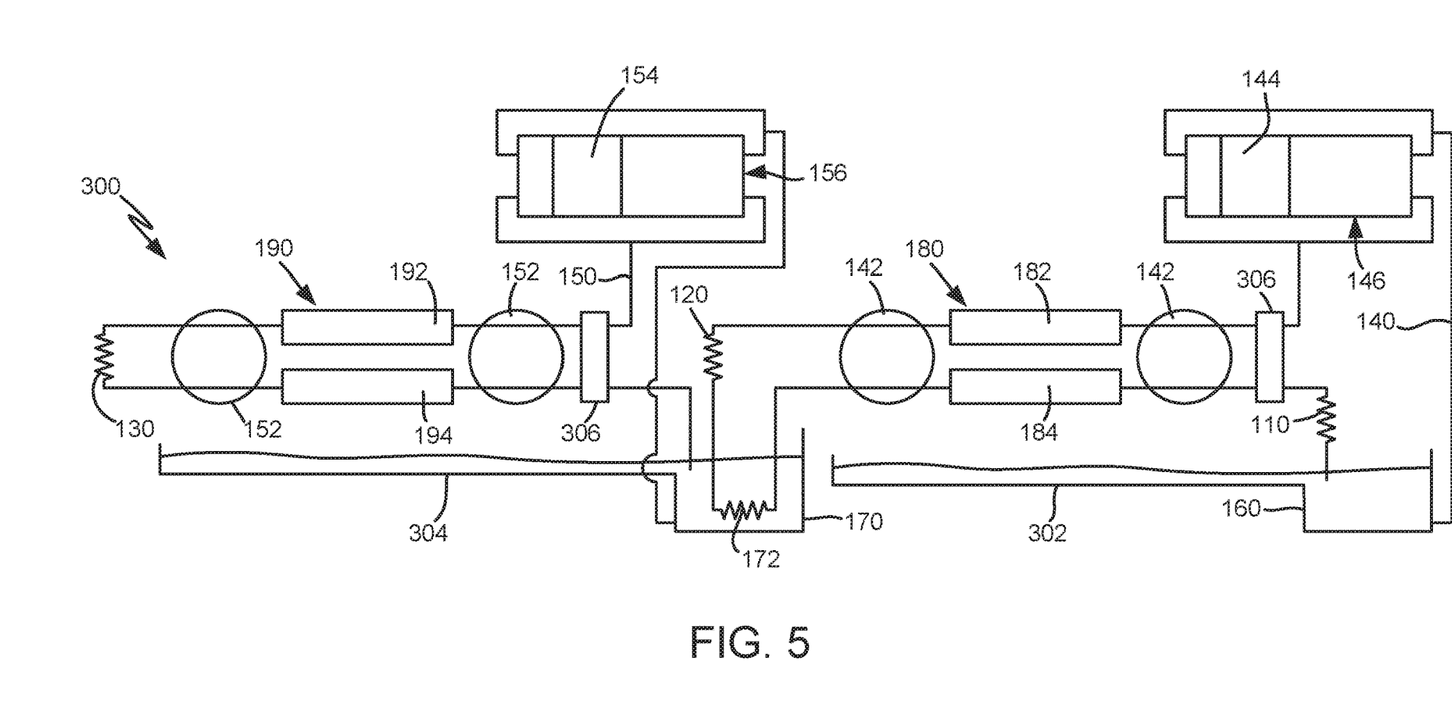
FIG. 5 is a schematic view of a heat pump system according to another example embodiment of the present subject matter.

FIG. 5 is a schematic view of a heat pump system 300 according to another example embodiment of the present subject matter. Heat pump system 300 may be used in or with any suitable appliance, such as refrigerator appliance 100. Thus, heat pump system 300 is described in greater detail below in the context of refrigerator appliance 100. Heat pump system 300 include numerous common components with heat pump system 100 (FIG. 3) and heat pump system 200 (FIG. 4) and operates in the same or similar manner. However, heat pump system 300 includes additional components as described below.

As shown in FIG. 5, a tray 302 of hot side reservoir 160 extends below first diverter valves 142 to recover leaks from first diverter valves 142. Similarly, a tray 304 of fresh food reservoir 170 extends below second diverter valves 152 to recover leaks from second diverter valves 152. Such trays 302, 304 may allow first and second diverter valves 142, 152 to permit small leaks, e.g., such that first and second diverter valves 142, 152 may have lower frictional losses (and lower sealing pressure) compared to diverter valves that are designed to not leak.

Heat pump system 300 also includes reversing valves 306. Reversing valves 306 may be actuated to reverse the direction of working fluid flow through fresh food and freezer regenerators 180, 190 for defrost. Thus, reversing valves 306 may allow operation of heat pump system 300 in reverse from that described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance, comprising:
   a cabinet defining a fresh food chamber and a freezer chamber;
   a hot side heat exchanger positioned outside of the fresh food chamber and the freezer chamber of the cabinet;
   a fresh food cold side heat exchanger positioned within the cabinet at the fresh food chamber, the fresh food chamber chillable with air from the fresh food cold side heat exchanger;
   a freezer cold side heat exchanger positioned within the cabinet at the freezer chamber, the freezer chamber chillable with air from the freezer cold side heat exchanger;
   a fresh food regenerator comprising a first caloric material stage and a second caloric material stage;
   a freezer regenerator comprising a first caloric material stage and a second caloric material stage, the first and second caloric material stages of the freezer regenerator separate from the first and second caloric material stages of the fresh food regenerator;
   a fresh food working fluid circuit coupling the hot side heat exchanger, the fresh food cold side heat exchanger and the fresh food regenerator such that a first working fluid is flowable through the hot side heat exchanger, the fresh food cold side heat exchanger and the fresh food regenerator via the fresh food working fluid circuit;
   a first pair of diverter valves coupled to the fresh food working fluid circuit, the first pair of diverter valves configured for selectively changing a flow direction of the first working fluid through the first caloric material stage and the second caloric material stage of the fresh food regenerator;
   a hot side reservoir coupled to the fresh food working fluid circuit, the hot side reservoir sized for containing a volume of the first working fluid, the hot side reservoir positioned outside of the fresh food chamber and the freezer chamber of the cabinet, the hot side reservoir positioned below one or both of the first pair of diverter valves;
   a freezer working fluid circuit coupling the freezer cold side heat exchanger and the freezer regenerator such that a second working fluid is flowable through the freezer cold side heat exchanger and the freezer regenerator via the freezer working fluid circuit; and
   a second pair of diverter valves coupled to the freezer working fluid circuit, the second pair of diverter valves configured for selectively changing a flow direction of the second working fluid through the first caloric material stage and the second caloric material stage of the freezer regenerator;
   a fresh food cold side reservoir coupled to the freezer working fluid circuit, the fresh food cold side reservoir sized for containing a volume of the second working fluid, the fresh food cold side reservoir positioned within the cabinet at the fresh food chamber, the fresh food cold side reservoir positioned below one or both of the second pair of diverter valves; and
   a liquid-liquid heat exchanger coupled to the fresh food working fluid circuit such that the first working fluid is flowable through the liquid-liquid heat exchanger, the liquid-liquid heat exchanger positioned at the fresh food cold side reservoir such the liquid-liquid heat exchanger is configured for exchanging heat between the first working fluid in the liquid-liquid heat exchanger and the second working fluid in the fresh food cold side reservoir.

2. The refrigerator appliance of claim 1, wherein the hot side reservoir is sized to contain no less than one hundred and fifty milliliters of the first working fluid.

3. The refrigerator appliance of claim 2, wherein the hot side reservoir is sized to contain no less than five hundred milliliters of the first working fluid.

4. The refrigerator appliance of claim 2, wherein the fresh food cold side reservoir is sized to contain no less than one hundred and fifty milliliters of the second working fluid.

5. The refrigerator appliance of claim 4, wherein the fresh food cold side reservoir is sized to contain no less than five hundred milliliters of the second working fluid.

6. The refrigerator appliance of claim 1, wherein the hot side reservoir is positioned below both of the first pair of diverter valves such that the hot side reservoir is configured to recapture leakage of the first working fluid from the first pair of diverter valves.

7. The refrigerator appliance of claim 6, wherein the fresh food cold side reservoir is positioned below both of the second pair of diverter valves such that the fresh food cold side reservoir is configured to recapture leakage of the second working fluid from the second pair of diverter valves.

8. The refrigerator appliance of claim 1, wherein the liquid-liquid heat exchanger is submerged within the second working fluid in the fresh food cold side reservoir.

9. The refrigerator appliance of claim 1, wherein the first pair of diverter valves and the hot side reservoir are positioned within a hermetic shell.

10. The refrigerator appliance of claim 1, wherein the second pair of diverter valves and the fresh food cold side reservoir are positioned within a hermetic shell.

11. The refrigerator appliance of claim 1, further comprising a pump connected to the fresh food working fluid circuit and the freezer working fluid circuit, the pump operable to flow the first working fluid through the fresh food working fluid circuit and to flow the second working fluid through the freezer working fluid circuit.

12. The refrigerator appliance of claim 11, wherein the pump comprises a first piston coupled to the fresh food working fluid circuit and a second piston coupled to the freezer working fluid circuit.

13. The refrigerator appliance of claim 12, wherein the first piston is positioned within a double-acting cylinder.

14. The refrigerator appliance of claim 12, wherein the second piston is positioned within a double-acting cylinder.

15. The refrigerator appliance of claim 1, further comprising a first field generator, a second field generator and a motor, the first field generator generating a field that is selectively applied to the first and second caloric material stages of the fresh food regenerator, the second field generator generating a field that is selectively applied to the first and second caloric material stages of the freezer regenerator, the motor operable to generate relative motion between the first field generator and the fresh food regenerator, the motor also operable to generate relative motion between the second field generator and the freezer regenerator.

16. The refrigerator appliance of claim 15, wherein the motor is coupled to the first and second pairs of diverter valves such that the motor is operable to actuate the first and second pairs of diverter valves.

17. The refrigerator appliance of claim 15, further comprising a pump connected to the fresh food working fluid circuit and the freezer working fluid circuit, the pump operable to flow the first working fluid through the fresh food working fluid circuit and to flow the second working fluid through the freezer working fluid circuit, the motor coupled to the pump such that the motor is operable to drive the pump.

18. The refrigerator appliance of claim 1, further comprising a first flow damper coupled to the fresh food working fluid circuit and a second flow damper coupled to the freezer working fluid circuit, the first flow damper configured to dampen pressure and flow spikes of the first working fluid in the fresh food working fluid circuit, the second flow damper configured to dampen pressure and flow spikes of the second working fluid in the freezer working fluid circuit.

19. The refrigerator appliance of claim 18, wherein each of the first and second flow dampers is one of a spring-loaded piston, a flexible tube and a flexible diaphragm.

\* \* \* \* \*